April 20, 1937.   R. F. PEO   2,077,582
BEARING SLEEVE AND JOINT ASSEMBLY
Filed Oct. 18, 1934
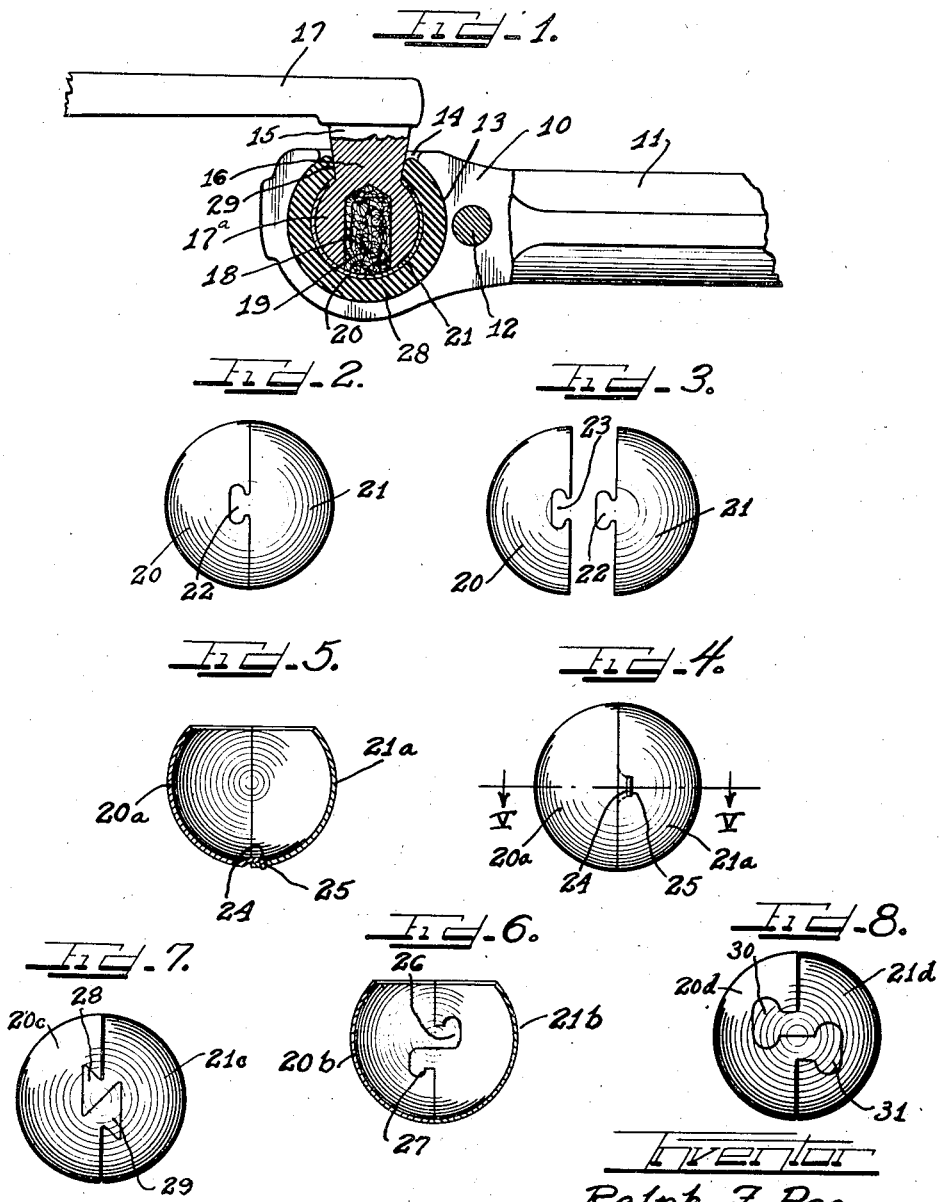
Inventor
Ralph F. Peo.

Patented Apr. 20, 1937

2,077,582

UNITED STATES PATENT OFFICE 2,077,582

BEARING SLEEVE AND JOINT ASSEMBLY

Ralph F. Peo, Buffalo, N. Y., assignor to Houde Engineering Corporation, Buffalo, N. Y., a corporation of New York Application October 18, 1934, Serial No. 748,843

6 Claims. (Cl. 287—90)

This invention relates to a bearing sleeve or cap for ball joints and includes a joint assembly utilizing said sleeve.

More specifically this invention relates to bearing caps adapted to be locked around the ball end of a ball stud in anti-friction engagement therewith.

Bearing shells or sleeves for ball joints have not heretofore been held in permanent assembled relation in the joint assembly and have in many instances been dislodged so as to interfere with free movement of the ball stud. The bearing sleeves as heretofore prepared were merely held around the ball end of the ball stud by pressure from a bushing member or were formed of a single piece of metal adapted to be snapped over a portion of the ball end. The use of friction alone to hold the sleeves in proper position, of course, is not reliable and the provision of a single metal sleeve capable of being snapped over the ball end necessitates the use of spring metal which is not always desirable for a bearing surface. Furthermore, a sleeve formed of a single piece of metal cannot be distended sufficiently so that it will snugly engage the entire ball end.

I have now provided bearing sleeves formed of cooperating segmental spherical members which can be securely locked together in assembled relation about the ball end of a stud member. The bearing sleeves or caps are provided with interlocking means on their registering peripheries and when assembled cannot be displaced from operative position during use of the joint assembly in which they are mounted.

It is therefore an object of this invention to provide segmental spherical bearing caps capable of being locked together around the ball end of a ball stud.

Another object of this invention is to provide a bearing sleeve formed of a pair of bearing caps capable of being secured together in assembled relation about the ball end of a ball stud.

A specific object of this invention is to provide bearing caps for ball joint assemblies which are provided with locking means along their registering peripheries to hold the caps in assembled relation in the joint assembly.

Another object of this invention is to provide interlocking bearing caps for joint assemblies at low cost.

Other and further objects of this invention will be apparent from the following disclosures and annexed sheet of drawings which forms a part of this specification.

On the drawing:

Figure 1 is a fragmentary longitudinal cross section of a joint assembly embodying a bearing sleeve according to this invention, with parts of the assembly shown in elevation.

Figure 2 is an elevational view of one form of bearing sleeve or cap according to this invention, in assembled relation.

Figure 3 is an elevational view showing the individual parts of the sleeve illustrated in Figure 2.

Figure 4 is an elevational view of another form of a bearing sleeve assembly according to this invention.

Figure 5 is a sectional view taken substantially along the line V—V of Figure 4.

Figure 6 is a central cross sectional view of another form of bearing sleeve assembly according to this invention.

Figure 7 is an elevational view of a bearing sleeve assembly illustrating another form of locking means for the individual bearing caps.

Figure 8 is an elevational view of still another alternative form of bearing sleeve illustrating another type of locking means for the cooperating members of the sleeve.

As shown on the drawing:

The joint assembly illustrated in Figure 1 comprises registering half sections 10 and 11 of a link such as is commonly used in shock absorber assemblies. The sections 10 and 11 may be secured together by any suitable means such as by a rivet or bolt 12. When assembled, the sections 10 and 11 define a segmental spherical socket 13 having an opening 14 therein. It should be understood that an identical socket may be formed by the other end of the members 10 and 11 or that any other connecting means may be provided at the other end of the link.

The opening 14 of the socket 13 is large enough to permit the shank 15 of a ball stud 16 to extend freely therethrough in spaced relation from the walls of the opening. The shank 15 of the ball stud 16 is adapted to receive a connecting member 17 thereon.

The ball end 17a of the stud 16 is provided with a reservoir or well 18 which is adapted to hold a supply of lubricant. If desired lubricant impregnated waste or other material 19 is packed into the well 18.

Thin metal bearing caps or sleeves 20 and 21 are secured together around the ball end 17a of the stud 16 in bearing relation therewith. These bearing caps 20 and 21, as best illustrated in Figures 2 to 8 inclusive, are formed of segmental spherical stamped metal pieces which may be held together by any suitable fastening means as by providing an ear 22 in the periphery of the cap 21 and by cutting a recess 23 in the cap 20 for receiving the ear 22 as shown in Figures 2 and 3. When the ear 22 is inserted in the recess 23, the caps 20 and 21 form a segmental sphere as shown in Figure 2 with a smooth inner bearing surface for engaging with the outer bearing surface of the ball end 17a.

In the modification shown in Figures 4 and 5, the cap 20a is provided with a tang 24 which is adapted to be inserted in a slot 25 cut in the cap 21a. The tang and slot provide an alternative arrangement for securing the cap members together.

In Figure 6, the cap members 20b and 21b are held together by interlocking jogs 26 and 27 formed in the registering peripheries of the caps.

In the modification shown in Figure 7, the cap 20c is provided with a dovetail extension 29 while the cap 21c is provided with a dovetail extension 28. Recesses are cut into the caps 20c and 21c for receiving the dovetail extensions 28 and 29 respectively. The cooperating dovetail extensions and recesses provide means for securely holding the caps 20c and 21c in assembled relation.

The caps 20d and 21d as shown in Figure 8 are held together by a pair of ears 30 and 31 similar to the ear 22 shown in Figures 2 and 3. The ears 30 and 31 are adapted to fit into recesses provided in the cap and serve to lock the caps together in assembled relation.

The forms of locking means shown in Figures 6 to 8 can be made from a single die whereas the forms shown in Figures 2 to 5 require use of individual cutting means or dies for each bearing cap.

The bearing caps in a joint assembly are firmly pressed against the bearing surface of the ball stud as shown in Figure 1 by a resilient bushing 28 which is held under compression in the socket housing 13. The bushing 28 has an outer wall conforming the socket wall and an inner recess adapted to receive the bearing cap. The bushing 28 preferably engages with the shank 15 of the stud 16 as shown at 29 for preventing loss of lubricant from the joint and also for preventing ingress of dirt to the joint.

The joint assembly illustrated in Figure 1 may be formed by inserting the cooperating parts of the joint in the link sections 10 and 11 before joining said sections together. When the sections 10 and 11 are secured together to define the housing 13, the resilient bushing 28 is held in the housing under sufficient compression to snugly engage with the housing walls and bearing sleeves. A movement of the stud 16 relative to the housing effects a slight inter-particle flow of the bushing 28 as well as relative movement between the ball end 17a and the bearing caps 20 and 21. The cooperating surfaces of the ball and the bearing shaft are supplied with lubricant from the reservoir 18 and the joint is thus at all times maintained in proper lubricated condition. The provision of lubricated bearing surfaces for the ball stud greatly relieves the burden of the resilient bushing in permitting relative movement between the stud and housing. The extra bearing surfaces so provided greatly prolong the life of the joint as most of the relative surface movement is between the ball and the bearing caps. The resilient bushing need only provide for such slight movement as may occur between the surface of the shank 15 and the opening 14 in the housing 13.

The resilient bushing 28 is preferably made of molded rubber which is formed to such size and shape as to fit snugly about the bearing cap and in engagement with the socket walls.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. A bearing shell for a joint having a ball stud member therein comprising a pair of complemental segmental spherical metal caps of such size as to form when assembled a member of greater than hemispherical size, and means on said caps interlockable with each other for securing said caps together as a unit around the ball end of the stud.

2. A bearing shell for ball joints comprising a pair of segmental spherical metal caps defining when assembled a segmental spherical bearing surface of greater than hemispherical size, and an opening through which a ball stud may freely extend, one of said caps having a tang formed thereon at the periphery thereof and the other of said caps having a registering slot therein for receiving the tang to lock the caps together as a unit whereby said caps may be disposed as a unit shell around the greater part of the ball end of a ball stud without distorting the metal of the shell.

3. A bearing shell adapted to be fitted as a unit around the greater part of the ball end of a ball stud without being distorted comprising a pair of segmental spherical metal caps defining when assembled a segmental spherical bearing surface greater than hemispherical size, said caps having registering peripheries, an ear extending from one of said peripheries and an opposed recess in the registering periphery of the other cap to lock the caps together as a unit.

4. A bearing shell for ball joints adapted to be fitted as a unit around the greater part of the ball end of a ball stud without being distorted comprising a pair of relatively thin segmental spherical metal caps of such size as to form when assembled a member of greater than hemispherical size, said caps having complementary registering extensions and recesses on their mating peripheries, said complementary registering extensions and recesses being adapted to lock the caps together as a unit to define a smooth bearing surface enveloping the ball end of a ball stud.

5. In a joint assembly including a housing defining a socket, a ball stud in said socket having a shank extending freely therefrom, a resilient bushing about the ball end of said stud having an outer surface conforming with the socket walls, a pair of segmental spherical bearing caps disposed in complemental relation around the greater part of the ball end in bearing contact therewith and means communicating with said caps to supply fluid lubricant to the engaging surfaces of the ball end and bearing caps, the improvement which comprises providing means on said caps interlockable with each other for securing the caps together as a unit around the ball end for preventing leakage of lubricant and displacement of the caps during movements of the assembly.

6. In a joint assembly including a socket member, a stud having a ball end in said socket and a shank portion extending freely from the socket, said ball end having a well formed therein for containing lubricant, a pair of complementarily disposed relatively thin segmental spherical bearing caps enveloping said ball end and adapted to receive lubricant from the well to lubricate the bearing surfaces of the ball end and caps and a resilient bushing in said housing between the bearing caps and housing walls, the improvement which comprises complementary registering extensions and recesses on the mating peripheries of said caps to lock the caps together as a unit about the greater part of the ball end whereby leakage of lubricant and displacement of the caps is prevented.

RALPH F. PEO.